(12) United States Patent
Yellepeddy (10) Patent No.: US 7,865,721 B2
(45) Date of Patent: *Jan. 4, 2011

(54) METHOD AND SYSTEM FOR CONFIGURING HIGHLY AVAILABLE ONLINE CERTIFICATE STATUS PROTOCOL

(75) Inventor: Krishna K. Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/866,549

(22) Filed: Oct. 3, 2007

(65) Prior Publication Data

US 2008/0172559 A1    Jul. 17, 2008

Related U.S. Application Data

(63) Continuation of application No. 10/314,477, filed on Dec. 6, 2002, now Pat. No. 7,318,155.

(51) Int. Cl.
H04L 29/06 (2006.01)
(52) U.S. Cl. .......................... 713/158; 713/156; 713/176
(58) Field of Classification Search .......... 713/155–158, 713/175, 176; 380/277–279, 286; 709/224–226
See application file for complete search history.

*Primary Examiner*—Nirav Patel
(74) *Attorney, Agent, or Firm*—Jeffrey S. LaBaw; David H. Judson (57) ABSTRACT

A method and system is presented for configuring a group of OCSP (Online Certificate Status Protocol) responders so that they are highly available. Each of the grouped OCSP responders share a common public key. When responding to an OCSP request, an OCSP responder generates an OCSP response that is signed with a group digital signature; the certificate for the common or group public key can be attached to the OCSP response. An OCSP client uses the group public key to verify the group digital signature on an OCSP response from any of the OCSP responders. For an OCSP client, the availability of this group of responders is greater than the availability of any one member of the group.

8 Claims, 7 Drawing Sheets

```
Certificate  ::=  SEQUENCE  {
     tbsCertificate          TBSCertificate,
     signatureAlgorithm      AlgorithmIdentifier,
     signature               BIT STRING  }

TBSCertificate  ::=  SEQUENCE  {
     version            [0]  Version DEFAULT v1,
     serialNumber            CertificateSerialNumber,
     signature               AlgorithmIdentifier,
     issuer                  Name,
     validity                Validity,
     subject                 Name,
     subjectPublicKeyInfo    SubjectPublicKeyInfo,
     issuerUniqueID     [1]  IMPLICIT UniqueIdentifier OPTIONAL,
     subjectUniqueID    [2]  IMPLICIT UniqueIdentifier OPTIONAL,
     extensions         [3]  Extensions OPTIONAL     }

Version  ::=  INTEGER  { v1(0), v2(1), v3(2)  }

CertificateSerialNumber  ::=  INTEGER

Validity ::= SEQUENCE {
     notBefore          Time,
     notAfter           Time  }

Time  ::= CHOICE {
     utcTime            UTCTime,
     generalTime        GeneralizedTime }

UniqueIdentifier  ::=  BIT STRING

SubjectPublicKeyInfo  ::=  SEQUENCE  {
     algorithm               AlgorithmIdentifier,
     subjectPublicKey        BIT STRING  }
```

*FIG. 4A*
*(PRIOR ART)*

```
CertificateList  ::=  SEQUENCE  {
     tbsCertList             TBSCertList,
     signatureAlgorithm      AlgorithmIdentifier,
     signatureValue          BIT STRING  }

TBSCertList  ::=  SEQUENCE  {
     version                 Version OPTIONAL,
     signature               AlgorithmIdentifier,
     issuer                  Name,
     thisUpdate              Time,
     nextUpdate              Time OPTIONAL,
     revokedCertificates     SEQUENCE OF SEQUENCE  {
          userCertificate         CertificateSerialNumber,
          revocationDate          Time,
          crlEntryExtensions      Extensions OPTIONAL
     }  OPTIONAL,
     crlExtensions      [0]  EXPLICIT Extensions OPTIONAL  }
```

*FIG. 4B*
*(PRIOR ART)*

```
OCSPRequest     ::=    SEQUENCE {
        tbsRequest                      TBSRequest,
        optionalSignature       [0]     EXPLICIT Signature OPTIONAL }

TBSRequest     ::=    SEQUENCE {
        version                 [0]     EXPLICIT Version DEFAULT v1,
        requestorName           [1]     EXPLICIT GeneralName OPTIONAL,
        requestList                     SEQUENCE OF Request,
        requestExtensions       [2]     EXPLICIT Extensions OPTIONAL }

Signature      ::=    SEQUENCE {
        signatureAlgorithm      AlgorithmIdentifier,
        signature               BIT STRING,
        certs                   [0] EXPLICIT SEQUENCE OF Certificate OPTIONAL}

Version    ::=    INTEGER    { v1(0) }

Request    ::=    SEQUENCE {
        reqCert                         CertID,
        singleRequestExtensions [0] EXPLICIT Extensions OPTIONAL }

CertID    ::=    SEQUENCE {
        hashAlgorithm           AlgorithmIdentifier,
        issuerNameHash          OCTET STRING, -- Hash of Issuer's DN
        issuerKeyHash           OCTET STRING, -- Hash of Issuers public key
        serialNumber            CertificateSerialNumber }

BasicOCSPResponse       ::= SEQUENCE {
        tbsResponseData         ResponseData,
        signatureAlgorithm      AlgorithmIdentifier,
        signature               BIT STRING,
        certs                   [0] EXPLICIT SEQUENCE OF Certificate OPTIONAL }

ResponseData   ::=    SEQUENCE {
        version                 [0] EXPLICIT Version DEFAULT v1,
        responderID                 ResponderID,
        producedAt                  GeneralizedTime,
        responses                   SEQUENCE OF SingleResponse,
        responseExtensions      [1] EXPLICIT Extensions OPTIONAL }

SingleResponse    ::=    SEQUENCE {
        certID                      CertID,
        certStatus                  CertStatus,
        thisUpdate                  GeneralizedTime,
        nextUpdate              [0] EXPLICIT GeneralizedTime OPTIONAL,
        singleExtensions        [1] EXPLICIT Extensions OPTIONAL }

CertStatus    ::=    CHOICE {
        good                    [0]     IMPLICIT NULL,
        revoked                 [1]     IMPLICIT RevokedInfo,
        unknown                 [2]     IMPLICIT UnknownInfo }

RevokedInfo    ::=    SEQUENCE {
        revocationTime              GeneralizedTime,
        revocationReason        [0] EXPLICIT CRLReason OPTIONAL }
```

METHOD AND SYSTEM FOR CONFIGURING HIGHLY AVAILABLE ONLINE CERTIFICATE STATUS PROTOCOL

CROSS-REFERENCE TO RELATED APPLICATION

This application is a continuation of Ser. No. 10/314,477, filed Dec. 6, 2002, now U.S. Pat. No. 7,318,155, from which priority is claimed and which is incorporated herein by reference.

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer authentication.

2. Description of Related Art

Concerns about the integrity and privacy of electronic communication have grown with adoption of Internet-based services. Various encryption and authentication technologies have been developed to protect electronic communication, such as asymmetric encryption keys.

The X.509 set of standards for digital certificates has been promulgated to create a common, secure, computational framework that incorporates the use of cryptographic keys. An X.509 digital certificate is an International Telecommunications Union (ITU) standard that has been adopted by the Internet Engineering Task Force (IETF) body. It cryptographically binds the certificate holder, presumably the subject name within the certificate, with its public cryptographic key. This cryptographic binding is based on the involvement of a trusted entity within the Internet Public Key Infrastructure for X.509 certificates (PKIX) called the certifying authority (CA). As a result, a strong and trusted association between the certificate holder and its public key can become public information yet remain tamper-proof and reliable. An important aspect of this reliability is a digital signature that the certifying authority stamps on a certificate before it is released for use. Subsequently, whenever the certificate is presented to a system for use of a service, its signature is verified before the subject holder is authenticated. After the authentication process is successfully completed, the certificate holder may be provided access to certain information, services, or other controlled resources, i.e. the certificate holder may be authorized to access certain systems.

PKIX essentially creates and manages two different but closely related constructs: an X.509 certificate and an X.509 Certificate Revocation List (CRL). As noted above, a digital certificate provides an assurance, i.e. a certification, for a public key of the subject holding the certificate, whereas a CRL is the means by which a certifying authority announces the dissolution of the binding represented in a certificate. In other words, a CRL is the means by which the certifying authority declares that a previously issued yet unexpired certificate is no longer valid. Certificates are revoked for a variety of administrative reasons, such as a change in the subject's affiliation with an organization, or security reasons, such as when the security of the certificate or an associated key has been compromised in some manner, such as loss, theft, or unauthorized disclosure of the private key. Certificates that have been revoked are permanently invalidated; they cannot be unrevoked, resumed, reinstated, or otherwise reactivated.

An issuing authority certifies a holder's public key by cryptographically signing the certificate data structure. Similarly, the revocation process is also certified by stamping the certifying authority's signature in the CRL data structure.

In order to properly validate a digital certificate, an application must check whether the certificate has been revoked. When the certifying authority issues the certificate, the certifying authority generates a unique serial number by which the certificate is to be identified, and this serial number is stored within the "Serial Number" field within an X.509 certificate. Typically, a revoked X.509 certificate is identified within a CRL via the certificate's serial number; a revoked certificate's serial number appears within a list of serial numbers within the CRL. Hence, an application that is validating a certificate must examine any certificate revocation lists that are potentially relevant to the certificate in order to determine whether the certificate has been revoked. In particular, any CRLs that have been recently published by the certificate authority that issued the certificate must be examined.

A certificate authority typically publishes a new CRL whenever a certificate is revoked. CRLs can be distributed to certificate-validating systems through a variety of mechanisms, but due to potential problems with pushing information to subscriber systems, commercial PKIX systems usually rely on a polling mechanism in which a certificate-validating application has the responsibility of polling for CRLs. The certificate authority can put newly published CRLs into particular locations, such as an LDAP (Lightweight Directory Access Protocol) directory, and this particular location is specified in the certificates that are issued by a certificate authority. However, checking CRLs for each certificate that is being processed by each certificate-using application can have a big performance impact on these applications.

In lieu of or in addition to checking for a CRL, a standard for the Online Certificate Status Protocol (OCSP) has been promulgated. The use of OCSP requires each certificate-using application to contact a server to get the status of a certificate, e.g., current, expired, or unknown. An OCSP client issues a status request to an OCSP responder and suspends acceptance of a certificate until the responder returns a response. In some circumstances, the availability of an OCSP responder may suffer from the overwhelming burden of numerous OCSP status requests.

Therefore, it would be advantageous to have a method and system that for configuring a set of OCSP responders in order to improve the availability of each of the OCSP responders.

SUMMARY OF THE INVENTION

A method, system, apparatus, and computer program product are presented for configuring a group of OCSP (Online Certificate Status Protocol) responders so that they are highly available. Each of the grouped OCSP responders share a common public key, but each OCSP responder maintains its own unique information for generating a group digital signature. When responding to an OCSP request, an OCSP responder generates an OCSP response that contains a group digital signature; the OCSP response can be accompanied by the certificate for the common public key, also termed the group public key. An OCSP client uses the group public key to verify the digital signature on an OCSP response from any of the OCSP responders. A computing environment that is supporting more than one OCSP responder can provide additional OCSP responders such that they can generate a group digital signature that can be verified by the group public key certificate. The availability of each of the OCSP responders in the group is increased when an OCSP responder is added to the group because the average processing load on each OCSP responder would be decreased.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 4C depicts some of the fields of an OCSP Request and an OCSP Response;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
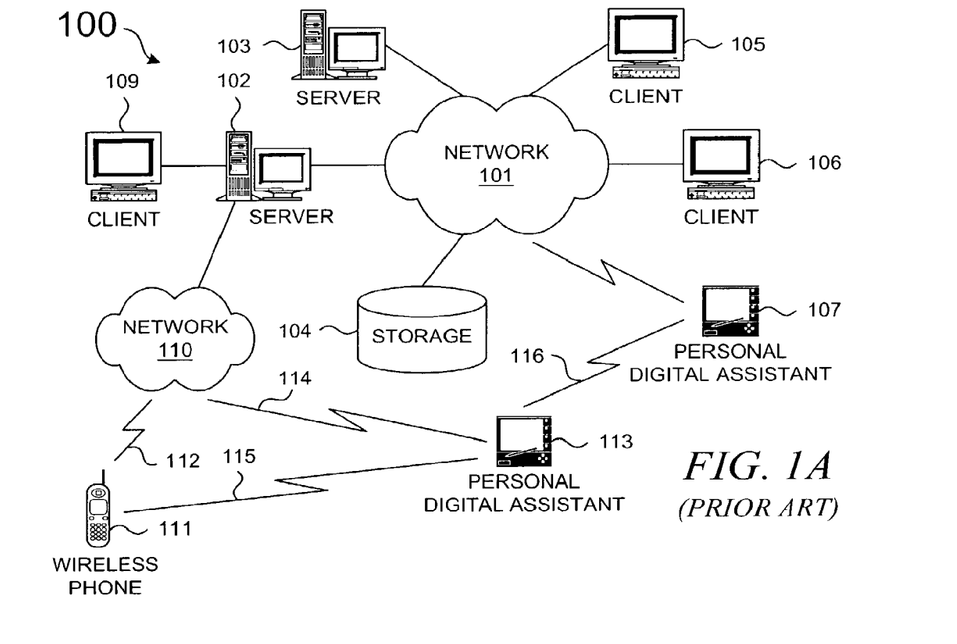
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
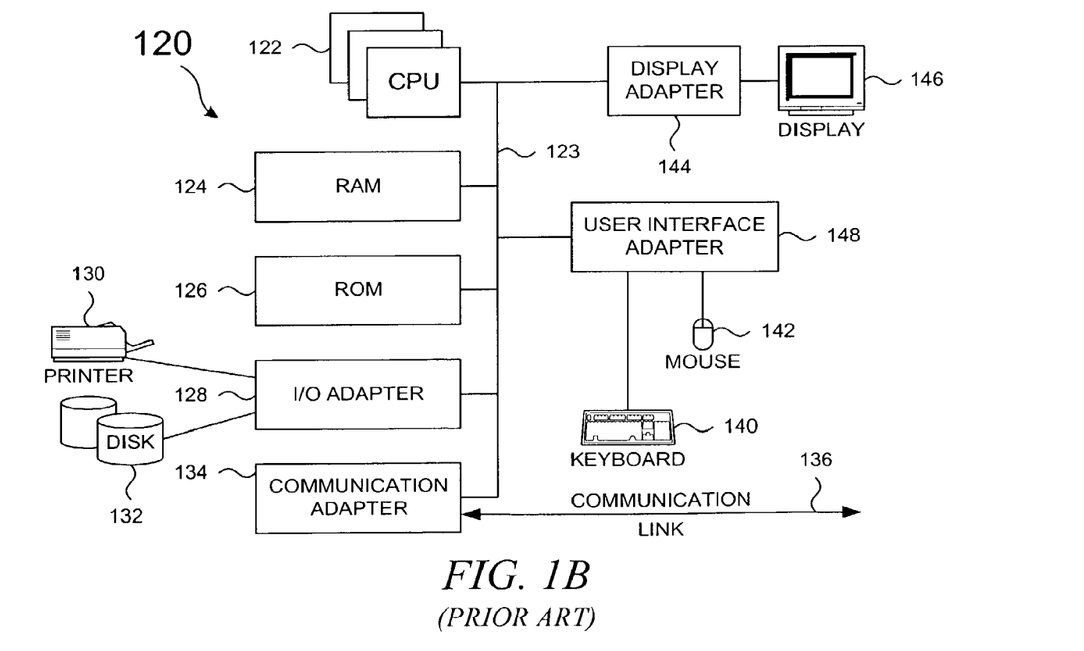
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find identical components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to improving the performance of applications or systems within a distributed data processing environment that employ OCSP (Online Certificate Status Protocol). To accomplish this goal, the present invention uses the trusted relationships associated with digital certificates in a novel manner. Before describing the present invention in more detail, though, some background information about digital certificates is provided for evaluating the operational efficiencies and other advantages of the present invention.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical asymmetric cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key of the intended recipient to encrypt data, and the receiver uses its private key to decrypt the encrypted message.

When authenticating data, data can be signed by computing a digital signature from the data using the private key of the signer. Once the data is digitally signed, it can be stored with the identity of the signer and the signature that proves that the data originated from the signer. A signer uses its private key to sign data, and a receiver uses the public key of the signer to verify the signature.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The CA usually has some kind of legal responsibilities for its vouching of the binding between a public key and its owner that allow one to trust the entity that signed a certificate. There are many such certificate authorities, such as VeriSign, Entrust, etc. These authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a company like VeriSign that provides trusted third-party certificate authority services. The certificate authority will then generate the certificate and return it. The certificate may contain other information, such as a serial number and dates during which the certificate is valid. One part of the value provided by a certificate authority is to serve as a neutral and trusted introduction service, based in part on their verification requirements, which are openly published in their Certification Service Practices (CSP).

A CA creates a new digital certificate by embedding the requesting entity's public key along with other identifying information and then signing the digital certificate with the CA's private key. Anyone who receives the digital certificate during a transaction or communication can then use the public key of the CA to verify the signed public key within the certificate. The intention is that the CA's signature acts as a tamper-proof seal on the digital certificate, thereby assuring the integrity of the data in the certificate.

Other aspects of certificate processing are also standardized. The Certificate Request Message Format (RFC 2511) specifies a format that has been recommended for use whenever a relying party is requesting a certificate from a CA. Certificate Management Protocols have also been promulgated for transferring certificates. More information about the X.509 public key infrastructure (PKIX) can be obtained from the Internet Engineering Task Force (IETF) at www.ietf.org. The description of FIGS. 2-4B provides some useful background information about digital certificates because the present invention resides in a distributed data processing system that processes digital certificates.

Figure 2:
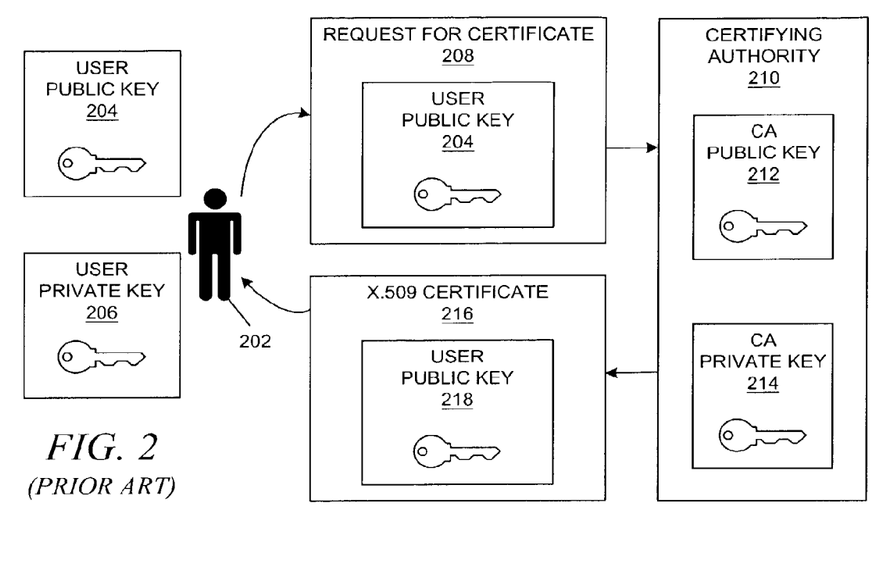
FIG. 2 depicts a typical manner in which an entity obtains a digital certificate.

With reference now to FIG. 2, a block diagram depicts a typical manner in which an individual obtains a digital certificate. User 202, operating on some type of client computer, has previously obtained or generated a public/private key pair, e.g., user public key 204 and user private key 206. User 202 generates a request for certificate 208 containing user public key 204 and sends the request to certifying authority 210, which is in possession of CA public key 212 and CA private key 214. Certifying authority 210 verifies the identity of user 202 in some manner and generates X.509 digital certificate 216 containing user public key 218. The entire certificate is signed with CA private key 214; the certificate includes the public key of the user, the name associated with the user, and other attributes. User 202 receives newly generated digital certificate 216, and user 202 may then present digital certificate 216 as necessary to engage in trusted transactions or trusted communications. An entity that receives digital certificate 216 from user 202 may verify the signature of the CA by using CA public key 212, which is published and available to the verifying entity.

Figure 3:
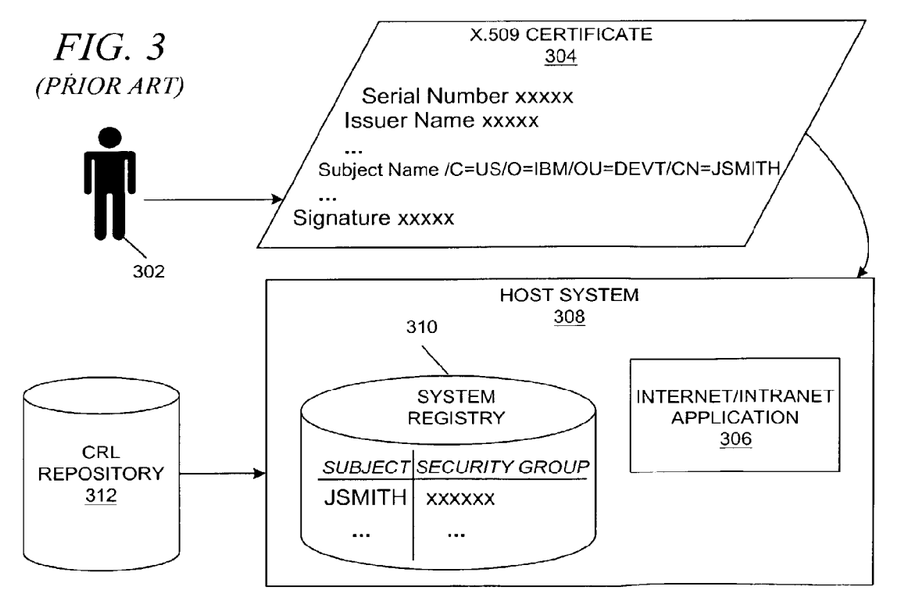
FIG. 3 depicts a block diagram that shows a typical manner in which an entity may use a digital certificate with an Internet system or application.

With reference now to FIG. 3, a block diagram depicts a typical manner in which an entity may use a digital certificate to be authenticated to an Internet system or application. User 302 possesses X.509 digital certificate 304, which is transmitted to an Internet or intranet application 306 on host system 308; application 306 comprises X.509 functionality for processing and using digital certificates. User 302 signs or encrypts data that it sends to application 306 with its private key.

The entity that receives certificate 304 may be an application, a system, a subsystem, etc. Certificate 304 contains a subject name or subject identifier that identifies user 302 to application 306, which may perform some type of service for user 302. The entity that uses certificate 304 verifies the authenticity of the certificate before using the certificate with respect to the signed or encrypted data from user 302.

Host system 308 may also contain system registry 310 which is used to authorize user 302 for accessing services and resources within system 308, i.e. to reconcile a user's identity with user privileges. For example, a system administrator may have configured a user's identity to belong to certain a security group, and the user is restricted to being able to access only those resources that are configured to be available to the security group as a whole. Various well-known methods for imposing an authorization scheme may be employed within the system.

As noted previously with respect to the prior art, in order to properly validate a digital certificate, an application must check whether the certificate has been revoked. When the certifying authority issues the certificate, the certifying authority generates a unique serial number by which the certificate is to be identified, and this serial number is stored within the "Serial Number" field within an X.509 certificate. Typically, a revoked X.509 certificate is identified within a CRL via the certificate's serial number; a revoked certificate's serial number appears within a list of serial numbers within the CRL.

In order to determine whether certificate 304 is still valid, application 306 obtains a certificate revocation list (CRL) from CRL repository 312 and validates the CRL. Application 306 compares the serial number within certificate 304 with the list of serial numbers within the retrieved CRL, and if there are no matching serial numbers, then application 306 validates certificate 304. If the CRL has a matching serial number, then certificate 304 should be rejected, and application 306 can take appropriate measures to reject the user's request for access to any controller resources.

Figure 4A:
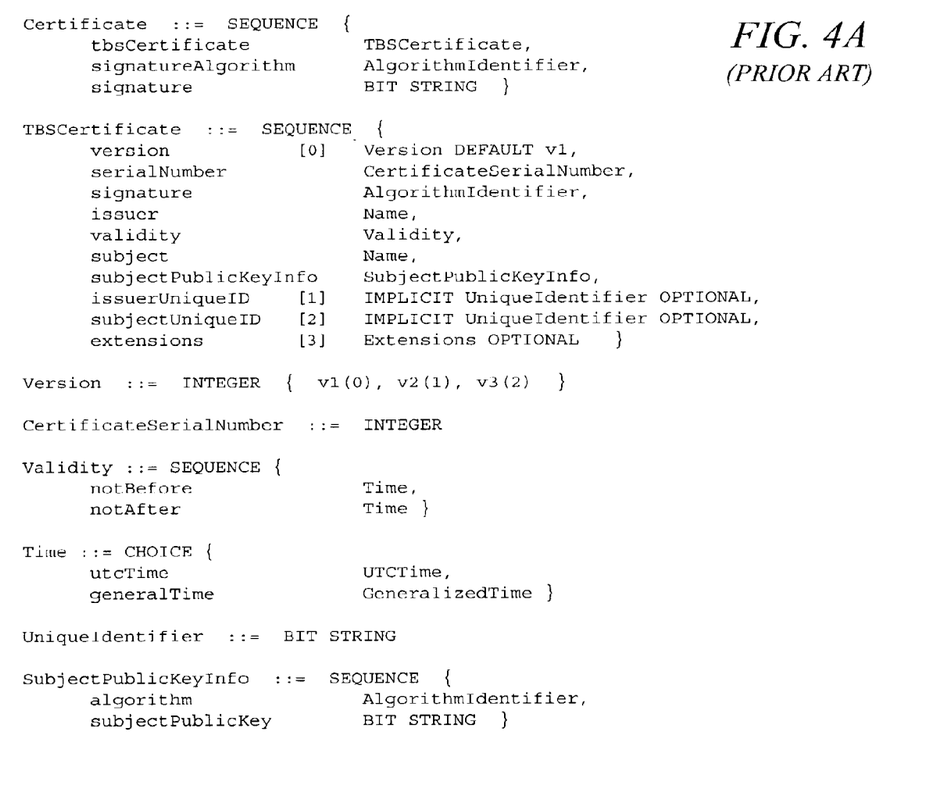
FIG. 4A depicts some of the fields of a standard X.509 digital certificate.

With reference now to FIG. 4A, some of the fields of a standard X.509 digital certificate are shown. The constructs shown in FIG. 4A are in Abstract Syntax Notation 1 (ASN.1) and are defined within the X.509 standard.

Figure 4B:
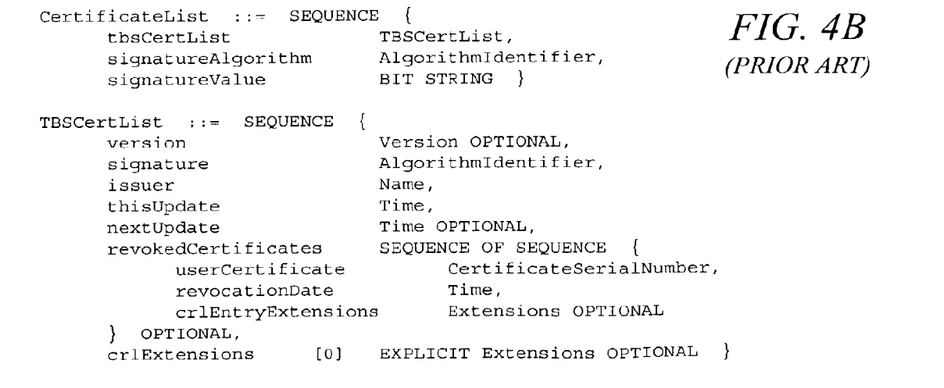
FIG. 4B depicts some of the fields of an X.509 certificate revocation list.

With reference now to FIG. 4B, some of the fields of an X.509 certificate revocation list are shown. Each revoked certificate is identified in a CRL using the construct shown in FIG. 4B, which is also in ASN.1 notation. Definitions for digital certificates and certificate revocation lists are specifically recited within "Internet X.509 Public Key Infrastructure Certificate and CRL Profile", IETF RFC 2459, January 1999.

As described above, a certificate revocation list is a mechanism by which a certificate is decertified. In other words, a CRL represents a dissolved or repudiated relationship between a trusted third party and a set of subjects that are holding or presenting a certificate, i.e. a user. Hence, CRLs are typically used to determine whether or not a certificate is valid prior to performing some operation on behalf of a user. As shown in FIG. 3, a CRL is typically used during an authentication process while a certificate is being validated.

As mentioned above, in lieu of or in addition to checking for a CRL, an application may use OCSP to obtain the status of a certificate. The use of OCSP requires each certificate-using application to contact a server to get the status of a certificate in question, e.g., good, expired, or unknown, thereby shifting the burden of determining the status of a certificate from a certificate-using application to an OCSP server. The application may incorporate a dedicated client module that handles the OCSP transaction. The server may be operated by a certificate authority that has issued the certificate in question, or the server may obtain and process CRLs on behalf of other applications so that those applications are not required to process CRLs.

With reference now to FIG. 4C, some of the fields of an OCSP Request and an OCSP Response are shown. The constructs shown in FIG. 4C are in Abstract Syntax Notation 1 (ASN.1) and are specifically recited within "X.509 Internet Public Key Infrastructure Online Certificate Status Protocol—OCSP", IETF RFC 2560, June 1999.

Figure 4D:
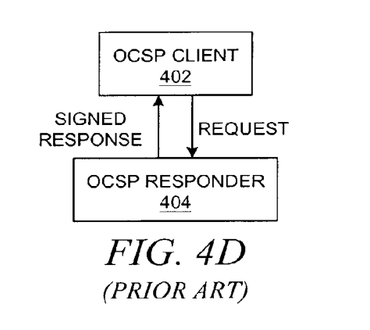
FIG. 4D depicts a block diagram that shows a simple OCSP (Online Certificate Status Protocol) transaction.

With reference now to FIG. 4D, a block diagram depicts a simple OCSP (Online Certificate Status Protocol) transaction. OCSP client 402 issues a status request to OCSP responder 404 and suspends acceptance of a certificate until the responder returns a signed response. According to the OCSP specification, the QCSP response message must be signed, and the key that is used to sign the response must belong to: the CA who issued the certificate in question; a trusted responder whose public key is trusted by the requester; or a CA Designated Responder (Authorized Responder) who holds a specially marked certificate issued directly by the CA that indicates that the responder may issue OCSP responses for that CA. Hence, before the OCSP client can verify that the OCSP response is valid, the OCSP client must establish a trust relationship with the OCSP responder and obtain the OCSP responder's public key.

Figure 4E:
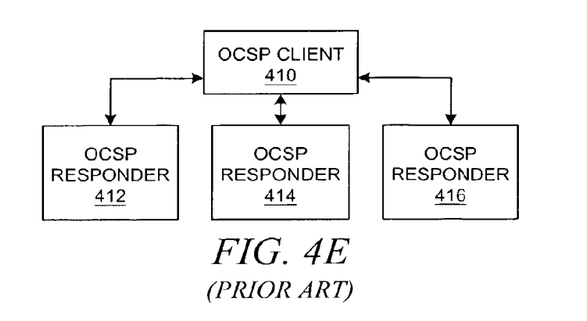
FIG. 4E depicts a block diagram that shows an organization of multiple OCSP responders.

With reference now to FIG. 4E, a block diagram depicts an organization of multiple OCSP responders. As mentioned above, in some circumstances, an OCSP responder may become overburdened with numerous OCSP status requests. A conventional approach to alleviating the burden on one OCSP responder might include spreading the processing load on multiple OCSP responders, as shown in FIG. 4E. Client 410 has established trust with multiple OCSP responders 412-416 and obtained the public key of each OCSP responder. If client 410 fails to receive a response from a particular OCSP responder, then client 410 could proceed down a list of OCSP responders until it found an OCSP responder that provided a response. In addition, if client 410 detects unsatisfactory response times from one OCSP responder, then client 410 can send subsequent OCSP requests to a different OCSP responder. However, this approach does not scale well, and the client is burdened with managing multiple trust relationships and the associated public keys.

Turning now to the present invention, the description of the remaining figures is directed to an explanation of a novel technique of improving the availability of multiple OCSP responders. In the present invention, multiple OCSP responders are associated with each other in a group. An OCSP client establishes trust with the group, preferably through a master OCSP responder. Each of the grouped OCSP responders share a common public key, but each OCSP responder maintains its own private key. When responding to an OCSP request, an OCSP responder generates an OCSP response that is signed with the OCSP responder's private key; the OCSP response can be accompanied by the certificate for the common public key, also termed the group public key. An OCSP client uses the group public key to verify the signature on an OCSP response from any of the OCSP responders. The OCSP client is able to ascertain that the message was digitally signed by a member of this group based on a chain of trust represented by a chain of certificates. The present invention is described below in more detail.

Figure 5:
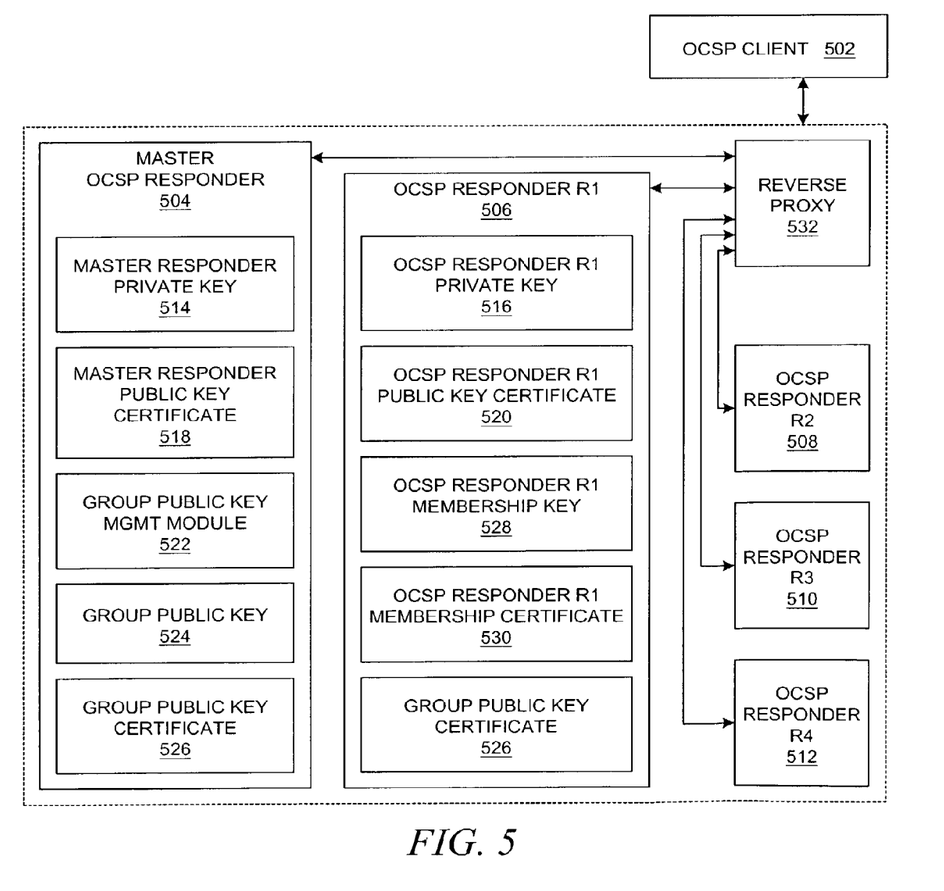
FIG. 5 depicts a block diagram that shows a group of multiple OCSP responders with a master OCSP responder in accordance with an embodiment of the present invention.

With reference now to FIG. 5, a block diagram depicts a group of multiple OCSP responders with a master OCSP responder in accordance with an embodiment of the present invention. At some point in time, OCSP client 502 needs to check the status of a certificate that is being used within a transaction, and OCSP client 502 sends an OCSP request message to any of OCSP responders 504-512. OCSP client obtains a network address, URT, or other identifier from a certificate authority or from some other means.

As in a typical system in which separate entities are using asymmetric cryptography, each OCSP responder has its own private key; master OCSP responder 504 has master OCSP responder private key 514, and OCSP responder 506 has private key 516. In addition, master OCSP responder 504 has public key certificate 518 that contains the public key that forms a private/public key pair along with private key 514. Similarly, OCSP responder 506 has public key certificate 520 that contains the public key that forms a private/public key pair along with private key 516. Master OCSP responder 504 and OCSP responder 506 use their private/public keys in a typical fashion for asymmetric cryptographic functions, such as encrypting and signing communications. However, as described in more detail below, these keys are used for non-OCSP communications, while a special set of asymmetric keys are used for OCSP communications.

Preferably, one of the OCSP responders in a set of OCSP responders is designated as a master OCSP responder, such as master OCSP responder 504, and the master OCSP responder in a group of OCSP responders comprises group public key management module 522. The designation of a single OCSP responder may be formally realized such that one and only one OCSP responder is configured to include a group public key management module, the importance of which is described in more detail further below. Alternatively, each of the OCSP responders in a group of OCSP responders could be configured to include a group public key management module such that each OCSP responder could act as a master OCSP responder if required. In this case, when a set of OCSP responders are initialized, they may dynamically determine which OCSP responder in the group shall act as the master OCSP responder, e.g., the first OCSP responder to reach a specific initialization state. The group public key management module of the master OCSP responder then becomes active, whereas the group public key management module of the other OCSP responders would remain inactive. If the master OCSP responder failed, then one of the other OCSP responders in the group could assert itself as a master OCSP responder in a failover fashion, if necessary. The manner in which an OCSP responder is designated as a master OCSP responder may vary with the implementation of the present invention.

As mentioned above, in a typical asymmetric cryptographic system, a pair of asymmetric keys are co-generated such that one unique private key corresponds to exactly one unique public key. Many different asymmetric key generation schemes exist, and these key generation schemes rely on mathematical relationships among the parametric numbers that are used to generate the keys. For example, asymmetric keys are frequently generated in accordance with the so-called RSA algorithm, which uses properties of large prime numbers to construct a private/public key pair; each pair shares a product of two prime numbers, i.e. the modulus. Knowledge of the public key provides the possibility of obtaining the private key, but this depends on factoring the modulus into its component primes, which can be made to be extremely difficult by choosing keys of adequate length such that the task would be practically unfeasible.

In contrast to commonly used asymmetric cryptographic methods in which a public key corresponds to one and only one private key, some asymmetric cryptographic schemes exist in which the one-to-one relationship does not hold. Using group signature schemes, a set of secret keys can be generated which correspond to a single public key. Through a judicious choice of parameters, the keys have particular numerical properties. A group signature scheme allows each entity within a group to sign a message in order to indicate that the message originated within the group, yet the entity that verifies the signature cannot identify any specific member of the group as the signer of the message. FIG. 5 shows an example of an embodiment of the present invention in which a particular group signature scheme is employed, although it should be noted that other group signature schemes could be employed without affecting the efficacy of the present invention.

In particular, the example in FIG. 5 follows a group signature scheme as described in Camenisch et al., "Efficient Group Signature Schemes for Large Groups", Advances in Cryptology—CRYPTO '97, 17th Annual Intl. Cryptology Conf., v. 1294 of Lecture Notes in Computer Science, Springer-Verlag, pp. 410-424, 1997. In one group signature scheme, a group manager selects a public key in accordance with particular numerical requirements during an initialization phase. When an entity wants to join the group, the entity selects a secret key and computes a membership key in accordance with a particular formula and other parameters. The joining entity then signs the membership key with a typical private key and sends the signature of the membership key along with other information to the group manager. After verifying the membership key and accompanying information as satisfying some criteria, the group manager sends a membership certificate to the joining entity. The membership certificate contains information that is subsequently used by the joining entity in conjunction with the membership key to generate a group signature.

Referring again to FIG. 5, master OCSP responder 504 acts as a group manager with respect to OCSP responders 506-512, which are members of a group of OCSP responders. This group is configured to generate group signatures in accordance with the present invention, which combines the use of group signature schemes with the use of the OCSP protocol in a novel manner. As mentioned previously, group public key management module 522 manages the administrative tasks that are associated with a group public key that is used by the group of OCSP responders to generate a group signature. One of the tasks that is required is to generate group public key 524; group public key certificate 526 contains group public key 524 and may be generated by a certificate authority or self-signed by master OCSP responder 504.

Each of the OCSP responders has a copy of group public key certificate 526. When each OCSP responder is initialized or configured, it may obtain a copy of the group public key certificate from the master OCSP responder or from some other entity. For example, master OCSP responder 504 may be responsible for publishing group public key certificate 526 in an appropriate directory so that the certificate becomes widely and publicly available.

Each OCSP responder maintains a unique membership key and a unique membership certificate, such as membership key 528 and membership certificate 530 at OCSP responder 506. These items enable OCSP responder 506 to generate a group signature as a member of the group of OCSP responders. OCSP client 502 can verify a group signature that is received from any of the OCSP responders using the group public key within the group public key certificate.

The membership key, the membership certificate, and the group public key certificate are data items that are separate and distinct from the typical private/public key pair that are also maintained by each OCSP responder, such as private key 516 and public key certificate 520. The membership key, the membership certificate, and the group public key certificate are used to sign and verify OCSP response messages, whereas the private/public key are used to sign and verify other message traffic.

For example, when OCSP responder 506 wishes to actively join the group of OCSP responders, possibly during a configuration, initialization, or setup phase, OCSP responder 506 signs its membership key 528 with its private key 516 and sends the signed membership key to master OCSP responder 504 in an appropriate message that indicates a request to join the group. Master OCSP responder 504 may receive public key certificate 520 along with the message; alternatively, master OCSP responder 504 may retrieve public key certificate 520 from a directory or obtain it through some other means. Master OCSP responder 504 verifies the signature on the membership key from OCSP responder 506 through use of the public key that is stored in public key certificate 520.

In a similar manner, master OCSP responder 504 can sign its messages to the OCSP responders using its private key 514, and the OCSP responders are able to verify that a message from master OCSP responder 504 is authenticate using a copy of public key certificate 518. An OCSP responder may receive a copy of public key certificate 518 along with a message; alternatively, an OCSP responder may retrieve public key certificate 518 from a directory or obtain it through some other means. Messages from master OCSP responder 504 may comprise the membership certificates that are generated by master OCSP responder 504 on behalf of each member in the group of OCSP responders. Requests between the master OCSP responder and a member of a group of OCSP responders can be formatted in any appropriate manner, preferably using messages that adhere to the Public-Key Cryptography Standards (PKCS).

If desired, reverse proxy 532 can be employed to disperse incoming OCSP requests among a set of OCSP responders in a load-balancing fashion. Since each OCSP responder can generate a group signature on behalf of the group, the processing of an OCSP request should not be adversely affected by the destination of an incoming OCSP request. Alternatively, OCSP client 502 can send an OCSP request directly to an OCSP responder.

Figures 6A, 6B:
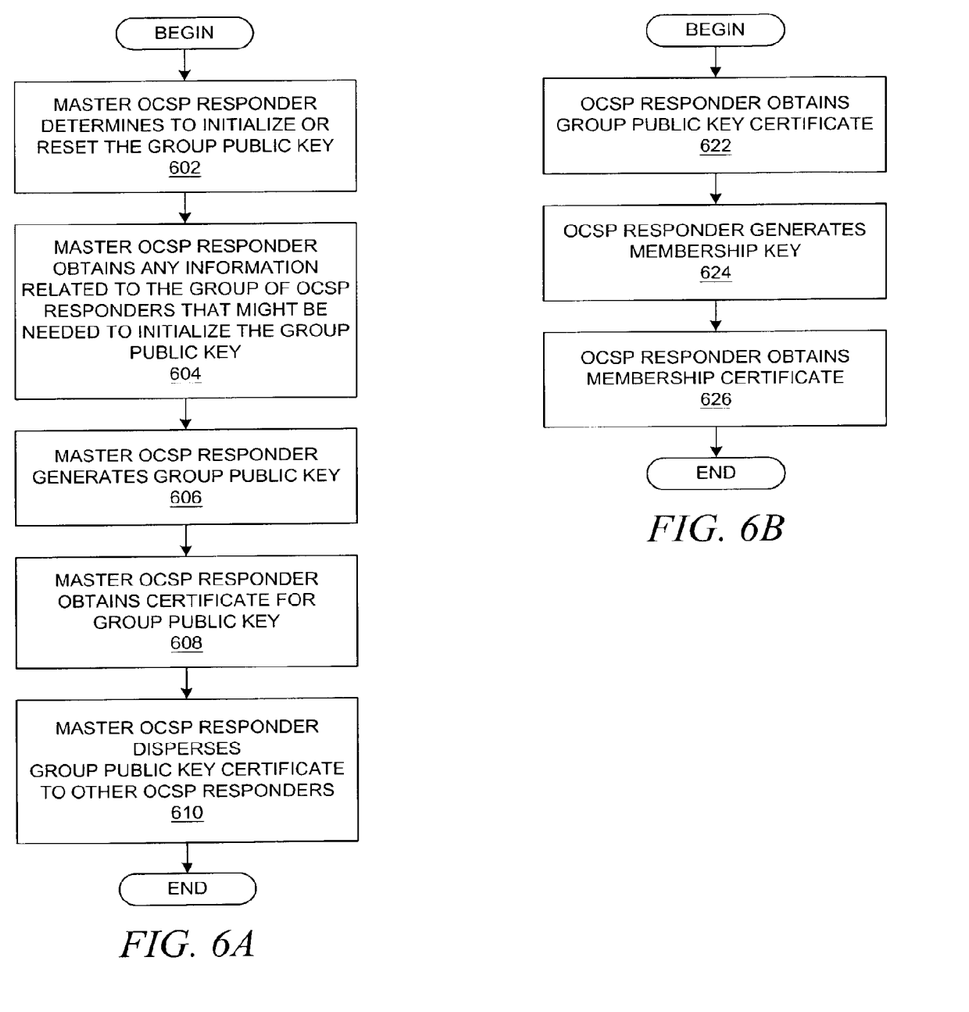
FIG. 6A depicts a flowchart that shows a process by which a set of OCSP responders are configured with a group public key.
FIG. 6B depicts a flowchart that shows a process by which an OCSP responder prepares to generate group signatures.

With reference now to FIG. 6A, a flowchart depicts a process by which a set of OCSP responders are configured with a group public key. The process begins with the master OCSP responder determining to initialize, refresh, reset, or otherwise modify a group public key (step 602), after which the master OCSP responder obtains any information that might be required by it to generate the public key or to obtain an appropriate public key certificate (step 604).

The master OCSP responder then generates a public key (step 606). The new group public key is generated on behalf of a group of OCSP responders that may be supported within a particular domain, such as a distributed computing environment of an enterprise. The master OCSP responder may generate a new group public key in response to a command from an administrative user or from a certificate authority, or the master OCSP responder may refresh the group public key on a periodic basis or according to some previously established criteria. Alternatively, the master OCSP responder may reset the group public key when one or more OCSP responders are brought online. Additional scenarios for resetting the group public key are discussed further below. The manner in which the decision is made to generate a new group public key may vary without affecting the present invention.

The master OCSP responder then obtains a certificate for the group public key (step 608), preferably from a third-party certificate authority, although the master OCSP responder may generate and self-sign the certificate if the OCSP clients have a trust relationship with the master OCSP responder and are willing to accept such certificates. According to the OCSP specification, the key that signs a certificate status message does not need to be the same key that signed the certificate about which status is being requested, and an issuer of a certificate may delegate OCSP signing authority by issuing a certificate containing a unique value in the "extendedKeyUsage" field in the OCSP signer's certificate. Hence, the master OCSP responder may request that the certificate for the group public key should be issued by the appropriate certificate authority with the indication of delegated authority.

The master OCSP responder then disperses the group public key to each of the OCSP responders in the group of OCSP responders (step 610). This may be performed by a simple request/response exchange between the master OCSP responder and another OCSP responder using PKCS-related message formats. Alternatively, a configuration file containing the group public key may be dispersed by an administrative user to the group of OCSP responders, or the administrative user may disperse the information through some other means, such as entering the information through a graphical user interface during a configuration or initialization phase at an OCSP responder. The manner of dispersal for the group public key may vary without affecting the present invention.

With reference now to FIG. 6B, a flowchart depicts a process by which an OCSP responder prepares to generate group signatures. FIG. 6B shows only a few steps that might be performed in order to configure an OCSP responder to be able to generate group signatures on OCSP response messages; the process that is shown in FIG. 6B would be performed when an OCSP responder is initialized, which may be done individually at each OCSP responder or as part of a setup phase for the entire group of OCSP responders. Alternatively, the act of receiving a group public key certificate from the master OCSP responder may trigger the process at each OCSP responder.

As mentioned above, an OCSP responder obtains a group public key certificate (step 622) in some manner. Assuming that a membership key and a membership certificate are necessary for a particular group signature scheme, the OCSP responder then generates a membership key (step 624), after which the OCSP responder obtains a membership certificate (step 626). The OCSP responder preferably obtains a group public key certificate prior to preparing any information that is necessary for its particular group signature scheme because the group public key certificate may contain parameters that are required by the process that generates the membership key. After preparing itself to generate group signatures, then the OCSP responder may then wait for the receipt of an OCSP request message.

Figures 6C, 6D:
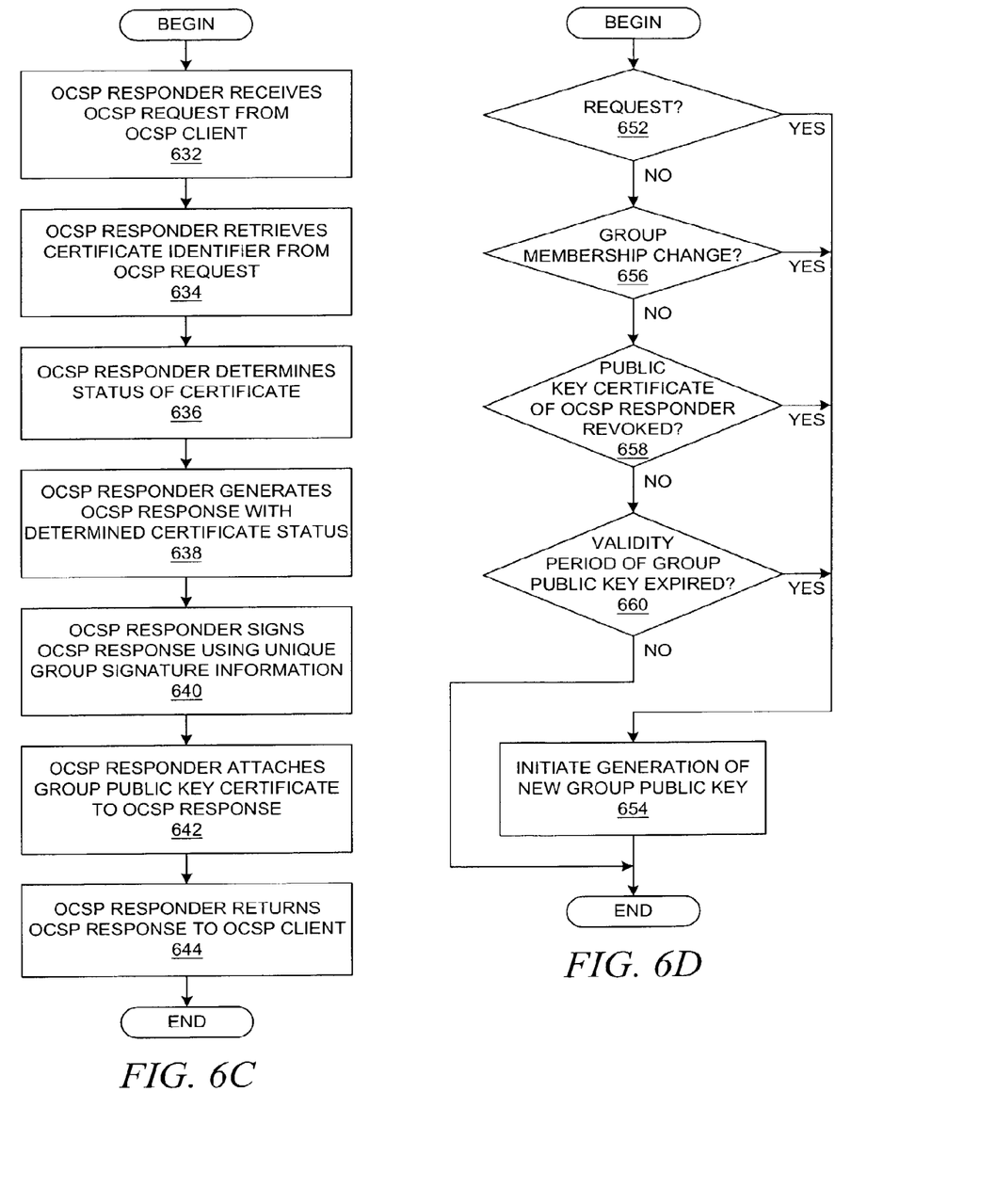
FIG. 6C depicts a flowchart that shows a process by which an OCSP responder that shares a group public key can generate an OCSP response.
FIG. 6D depicts a flowchart that shows a subprocess by which the master OCSP responder determines to reset the group public key.

With reference now to FIG. 6C, a flowchart depicts a process by which an OCSP responder that shares a group public key can generate an OCSP response. The process that is shown in FIG. 6C may be performed by the master OCSP responder or by one of the other OCSP responders within the group because all of the OCSP responders within the group, including the master OCSP responder, use a common group signature scheme. The process assumes that the OCSP responder has been previously configured with a group public key certificate that is common to each of the OCSP responders within a group of OCSP responders, such as through the exemplary process that is described with respect to FIG. 6A. The process also assumes that the OCSP responder has been previously configured with any other group signature information that may be required by the OCSP responder, such as through the exemplary process that is described with respect to FIG. 6B.

The process begins with the OCSP responder receiving an OCSP request message from an OCSP client (step 632). The OCSP responder retrieves a certificate identifier from the OCSP request (step 634) and determines the status of the identified certificate (step 636); the responder may determine certificate status by scanning published certificate revocation lists from a certificate authority or through some other means. The OCSP responder generates an OCSP response message with the determined certificate status (step 638) and signs the OCSP response message using its unique group signature information (step 640), such as its membership key and information from its membership certificate. The OCSP responder then attaches the group public key certificate to the OCSP response message (step 642) and returns the OCSP response message to the OCSP client (step 644), thereby concluding the process.

The format of an OCSP response message provides for an OCSP responder to attach zero or more certificates, as shown by the "certs" field of an OCSP response in FIG. 4C, so an OCSP responder in an embodiment of the present invention could attach a chain of certificates. For example, if the master OCSP responder obtained the group public key certificate from a certificate authority, then the OCSP responder would attach the group public key certificate to the OCSP response message, and it would be assumed that the OCSP client would possess or could retrieve the public key certificate of the certificate authority so that it may verify the authenticity of the group public key certificate prior to using the group public key certificate to verify the authenticity of the OCSP response message. However, if the master OCSP responder has generated and self-signed the group public key certificate, then the OCSP responder could attach the group public key certificate along with the public key certificate from the master OCSP responder that is required to verify the authenticity of the group public key certificate; in other words, the certificate chain is extended in a standard manner to accommodate the group public key certificate. Alternatively, rather than attaching any public key certificates, it may be assumed that the OCSP client is able to retrieve any needed public key certificates from an appropriate LDAP (Lightweight Directory Access Protocol) directory into which the public key certificates had been previously stored; such directories are commonly used to publish public key certificates such that many entities can obtain public keys when necessary.

A prior art OCSP responder must be configured with a private/public key pair in some manner, after which it accepts OCSP requests and generates OCSP responses. Typically, the prior art OCSP responder would generate its own private/public key pair and obtain its own public key certificate.

In a similar manner, an OCSP responder in the present invention is configured with a public key certificate except that, in the present invention, an OCSP responder shares the public key with a set of OCSP responders. In other words, it should be apparent in light of FIG. 6C that, after configuring the OCSP responder with unique group signature information and a group public key certificate that is common to each of the OCSP responders within a set of OCSP responders, an OCSP responder operates in a manner that would be typical of a prior art OCSP responder. Hence, in the present invention, no changes are required to an OCSP responder with respect to the Online Certificate Status Protocol; an OCSP responder uses the OCSP protocol without any modifications to the OCSP protocol.

Similarly, an OCSP client requests and receives certificate status using the OCSP protocol without any modifications. The OCSP client is able to verify the authenticity of an OCSP response using any appropriate certificates in a trust hierarchy. If the certificate for the group public key is granted by a certificate authority, then the client trusts this certificate because it trust the certificate authority; the client has the certificate for the certificate authority that allows it to verify the signature on the certificate of the group public key. If the certificate for the group public key is granted by the master OCSP responder, then the client trusts this certificate because it has been issued and signed by the master OCSP responder, whose certificate has been issued and signed by the certificate authority. In either case, there is no modification to the OCSP protocol since the client receives or retrieves the appropriate digital certificates that it needs to verify the digital signature on an OCSP response message. Moreover, the OCSP client can cache the group public key certificate in accordance with the certificate's expiration restrictions without any additional maintenance of multiple public key certificates for multiple OCSP responders as would be required by prior art solutions.

The OCSP client knows which algorithm was used to sign a received OCSP response because the signing algorithm is indicated within the OCSP response. Therefore, the OCSP client knows the group signature algorithm that should be used to verify the group signature in an OCSP response that was received from one of the OCSP responders. For example, FIG. 4C shows a "signatureAlgorithm" field within the "BasicOCSPResponse" data structure; the signature algorithm indicator would be filled with a standard or commonly-agreed-upon value that indicates the group signature algorithm. As noted in RFC 2560, Section 4.3. "Mandatory and Optional Cryptographic Algorithms":

> Clients that request OCSP services SHALL be capable of processing responses signed used DSA keys identified by the DSA sig-alg-oid specified in section 7.2.2 of (RFC 2459). Clients SHOULD also be capable of processing RSA signatures as specified in section 7.2.1 of (RFC 2459). OCSP responders SHALL support the SHA1 hashing algorithm.

Hence, an OCSP client merely needs to be aware of the group digital signature algorithm along with the many other digital signature algorithms that may be used to sign the OCSP response messages; the processing that is associated with the OCSP protocol is unchanged.

With reference now to FIG. 6D, a flowchart depicts a subprocess by which the master OCSP responder determines to reset the group public key. The master OCSP responder is responsible for the life-cycle management of the group public key. In order to manage the life-cycle of the group public key, the master OCSP responder may maintain information about each member in the group of OCSP responders. As part of the life-cycle management tasks, the master OCSP responder is responsible for deciding the validity period of a group public key, initiating updates of the keys, and handling revocation of the group public key. As mentioned with respect to step 602 in FIG. 6A, the master OCSP responder may determine that the group public key needs to be initialized, reset, refreshed, or otherwise modified at some point in time; FIG. 6D provides a subprocess for this determination by showing some conditions, although other embodiments of the present invention may have different or additional conditions or considerations.

The subprocess may be part of a loop in which the master OCSP responder continually processes events.

The subprocess begins with the master OCSP responder determining whether it has received a specific request to refresh the group public key (step 652). The request may originate in another administrative application, or the request may originate from one of the group OCSP responders. Part of the administrative duties of each member of the group may include the ability to monitor or receive an indication, e.g., from an administrative user or other application, that the keys or certificates of an OCSP responder have been compromised in some manner. For example, if there is reason to suspect that a membership key at a particular OCSP responder has been stolen, then the OCSP responder should request that the group public key should be renewed. Alternatively, rather than generating a new group public key, the master OCSP responder may remove the requesting OCSP responder from the group until some later point in time, e.g., some other determined condition for which the master OCSP responder decides to renew the group public key.

In any case, if the master OCSP responder receives a valid request, then the master OCSP responder initiates the generation of a new group public key (step 654), and the subprocess is completed. As mentioned above, if the master OCSP responder did not generate and self-sign the group public key certificate, then the master OCSP responder would have requested the group public key certificate from a certificate authority. In this case, as part of initiating the generation of a new group public key, the master OCSP sends a revocation request to the certificate authority that issued the group public key certificate. The generation of the new group public key and associated certificate would then occur as described with respect to FIG. 6A, which may include notifying each member in the group of OCSP responders that a new public key is being generated.

Referring again to FIG. 6D, another condition is whether there is a change of group membership in the group of OCSP responders (step 656). For example, an OCSP responder may fail, so it would be deleted from the group, or another OCSP responder may be brought online. Depending on the group signature scheme that is used in a given embodiment of the present invention, a change in group membership may require the renewal of the group public key at step 654. The group signature scheme that was mentioned above and discussed with respect to FIG. 5, however, allows for members to join a group without disrupting the use of a deployed group public key.

Another consideration for generating a new group public key includes whether or not a public key certificate of a group OCSP responder has been revoked (step 658). In the present invention, the master OCSP responder relies on the validity of the public key certificates of each OCSP responder in verifying message traffic between the master OCSP responder and another OCSP responder in the group. If the public key certificate of an OCSP responder is compromised, then the master OCSP responder could possibly receive requests for membership certificates from a malicious third party. Hence, the master OCSP responder scans published CRLs for revocations of any of the public key certificates that it has obtained and stored. In a similar manner, the master OCSP responder may scan published CRLs for a revocation of the group public key certificate. Although the master OCSP responder would probably initiate the revocation of a group public key certificate, there may be scenarios in which the certificate authority that issued the group public key certificate may revoke it unilaterally.

Another condition or consideration for generating a new group public key includes whether or not the validity period of the group public key certificate has expired (step 660). As mentioned above, the master OCSP responder decides the validity period for a group public key and any associated information. For example, the master OCSP responder may compute the validity period by examining the expiration dates of the public key certificates of the group OCSP responders, which the master OCSP responder should be able to obtain independently from a directory or other type of database. In an exemplary embodiment, the master OCSP responder would set the expiration date of the group public key certificate to be equal to the earliest expiration date among the public key certificates of all of the OCSP responders. An expiration date is part of the information in a digital certificate; if the group public key certificate is generated by a certificate authority, then the computed expiration date would be sent along with the group public key in a certificate request message to the certificate authority.

Alternatively, rather than waiting for the expiration date of the group public key certificate, the master OCSP responder may be configured to initiate the renewal process for the group public key within a threshold period before the group public key certificate expires. For example, the threshold value may be specified as one or more days so that the master OCSP responder has sufficient time to communicate with the other OCSP responders and to ensure that they are reconfigured with the appropriate information for generating group signatures.

The advantages of the present invention should be apparent in view of the detailed description that is provided above. A computing environment that is supporting more than one OCSP responder can provide additional OCSP responders in a simple fashion by using a group signature scheme in a group of OCSP responders. Assuming that incoming OCSP requests are distributed evenly among the group of OCSP responders, possibly through random selection by OCSP clients or through the use of a proxy server that performs load balancing, for an OCSP client, the availability of this group of responders is greater than the availability of any one member of the group.

It is important to note that while the present invention has been described in the context of a fully functioning data processing system, those of ordinary skill in the art will appreciate that the processes associated with the present invention are capable of being distributed in the form of instructions in a non-transitory computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer program product in a non-transitory computer readable medium for use in a data processing system for providing certificate status within a distributed computing environment comprising a set of Online Certificate Status Protocol (OCSP) responders, the computer program product storing computer program instructions which when executed by the data processing system perform a method comprising:
   configuring the OCSP responders to dynamically determine and designate one of the OSCP responders in the set as a master OCSP responder responsible for managing the set of OCSP responders;
   dispersing from the master OCSP responder to each OCSP responder in the set of OCSP responders a copy of a public key certificate, wherein an asymmetric cryptographic public key is stored within the public key certificate;
   setting an expiration period of the public key certificate to be equal to an earliest expiration date among public key certificates associated with OCSP responders in the set of OCSP responders;
   configuring each OCSP responder in the set of OCSP responders so that each OCSP responder can generate a group digital signature;
   receiving from an OCSP client an OCSP request message at an OCSP responder in the set of OCSP responders; and
   returning to the OCSP client an OCSP response message comprising the group digital signature.

2. The computer program product of claim 1 wherein the method further comprises:
   obtaining one asymmetric cryptographic public key and an associated set of unique asymmetric cryptographic keys, wherein the asymmetric cryptographic public key is able to verify a group digital signature that is generated by using any key in the associated set of unique asymmetric cryptographic keys;
   configuring each OCSP responder in the set of OCSP responders with a unique asymmetric cryptographic key; and
   generating the OCSP response message comprising the group digital signature that is generated by the OCSP responder using its unique asymmetric cryptographic key.

3. The computer program product of claim 1 wherein the method further comprises:
   attaching a copy of a public key certificate to the OCSP response message.

4. The computer program product of claim 1 wherein the method further comprises:
   generating the asymmetric cryptographic public key at the master OCSP responder.

5. The computer program product of claim 1 wherein the method further comprises:
   managing a life-cycle of the asymmetric cryptographic public key at the master OCSP responder.

6. The computer program product of claim 1 wherein the method further comprises:
   revoking the public key certificate for the asymmetric cryptographic public key when a public key certificate associated with an OCSP responder in the set of OCSP responders expires or is revoked.

7. The computer program product of claim 1 wherein the method further comprises:
   distributing additional OCSP request messages across the set of OSCP responders according to a load balancing scheme.

8. A computer program product in a non-transitory computer readable medium for use in a data processing system for providing certificate status within a distributed computing environment comprising a set of Online Certificate Status Protocol (OCSP) responders, the computer program product storing computer program instructions which when executed by the data processing system perform a method comprising:
   configuring the OCSP responders to dynamically determine and designate one of the OSCP responders in the set as a master OCSP responder responsible for managing the set of OCSP responders;
   dispersing from the master OCSP responder to each OCSP responder in the set of OCSP responders a copy of a public key certificate, wherein an asymmetric cryptographic public key is stored within the public key certificate;
   revoking the public key certificate for the asymmetric cryptographic public key when a public key certificate associated with an OCSP responder in the set of OCSP responders expires or is revoked;
   configuring each OCSP responder in the set of OCSP responders so that each OCSP responder can generate a group digital signature;
   receiving from an OCSP client an OCSP request message at an OCSP responder in the set of OCSP responders; and
   returning to the OCSP client an OCSP response message comprising the group digital signature.

* * * * *